United States Patent Office 3,166,567
Patented Jan. 19, 1965

3,166,567
2,3;4,5-DIBENZO-1,3a,6,6a-TETRAAZA-
PENTALENES
Rudolph A. Carboni, Wilmington, Del., assignor to E. I.
du Pont de Nemours and Company, Wilmington, Del.,
a corporation of Delaware
No Drawing. Filed Jan. 17, 1963, Ser. No. 252,059
3 Claims. (Cl. 260—308)

This invention relates to a new group of nitrogen-containing compounds, and more particularly to a new group of dibenzotetraazapentalenes.

Organic nitrogen containing cyclic compounds as a class are technically important and have found considerable utility in biological and dyestuff applications. As a general rule, compounds having a plurality of nitrogens have low stability. An exception that has been reported recently (Reissue 25,238), is illustrated by the compound:

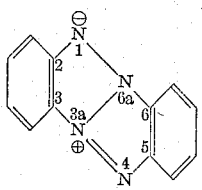

namely, 2,3;5,6-dibenzo-1,3a,4,6a-tetraazapentalene. The peculiar stability of this colored compound and its nuclear derivatives is probably due to their specific ring system.

In accordance with this invention, there have now been obtained compounds having a new dibenzotetraazapentalene ring system wherein one nuclear nitrogen is attached to two different benzenoid groups and one nuclear nitrogen is attached only to other nitrogens.

The benzenoid rings on the compounds of this invention can be substituted, or unsubstituted, as in the case of the compound 2,3;4,5-dibenzo-1,3a,6,6a-tetraazapentalene. Since there are four replaceable hydrogens on each benzenoid ring, there are a total of eight positions where substitution can take place. Examples of substituents are electrophilic substituents such as nitro, halo, azido, amino and sulfonyl radicals. Other substituents include hydrocarbon substituents free of non-benzenoid unsaturation. Such hydrocarbon substituents can be bonded to one, or more than one position on a benzenoid ring. Thus, the compound 2,3-naphtho-4,5-benzo-1,3a,6,6a-tetraazapentalene can be viewed as having a four-carbon atom hydrocarbon substituent free of non-benzenoid unsaturation bonded to two adjacent positions on one benzenoid ring.

Preferred compounds of this invention have the formula:

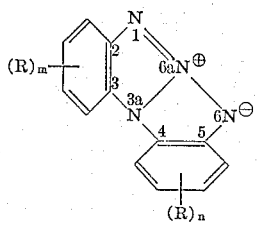

wherein the R's are selected from at least one of the group consisting of nitro, halo, azido, amino, sulfonyl and 1 to 4 carbon atom hydrocarbon radicals, and $m$ plus $n$ equals a cardinal number of up to 4, that is, 0 to 4. Compounds wherein $m$ and $n$ are each cardinal numbers of up to 2 are particularly preferred.

The compounds of this invention can be prepared by (a) reducing a 1-(o-nitroaryl)-1,2,3-benzotriazole to yield the corresponding amine, (b) converting the amine to the corresponding azido derivative by reacting it with an alkali metal nitrite in the presence of a strong acid to convert the amine to the diazonium salt, then reacting the diazonium salt with an alkali metal azide to yield the azido derivative, and (c) heating the resulting product to a temperature of at least about 100° C. to yield a 2,3;4,5-dibenzo-1,3a,6,6a-tetraazapentalene. The reduction of the 1-(o-nitroaryl)-1,2,3-benzotriazole can be carried out in the conventional manner, for example, by using a chemical reducing agent such as sodium sulfide, or by catalytic hydrogenation, for example, at temperatures of 20 to 50° C. using low hydrogen pressure, e.g., up to 10 atmospheres, and a noble metal catalyst. The reduction is usually carried out in a solvent medium, for example, alcohol or tetrahydrofuran. The conversion of the resulting 1-(o-aminoaryl)-1,2,3-benzotriazole to the corresponding azide derivative is conveniently carried out by first reacting the amino derivative with an alkali metal nitrite such as sodium or potassium nitrite in the presence of a non-oxidizing strong acid, for example, a mineral acid such as HCl, $H_2SO_4$ or HBr, in water at temperatures of 0 to 20° C. The diazonium salt is then converted to the 1-(o-azidoaryl)-1,2,3-benzotriazole by reaction with an alkali metal azide under similar conditions. The thermal decomposition of the azido derivative to the tetraazapentalene is usually carried out at a temperature of at least 100° C., and preferably 100 to 250° C. in the presence of a solvent. Reaction of the 2,3;4,5-dibenzo-1,3a,6,6a-tetraazapentalene with electrophilic reagents employed in aromatic ring substitutions results in the formation of derivatives such as the halo, nitro, and sulfonyl derivatives, etc.

The new compounds of this invention have highly aromatic character that is unusual for a system containing so many nuclear nitrogens. The properties of high chemical and thermal stability of the system, relatively long wave length absorption in the ultraviolet and other properties are in keeping with a "mesoionic" type of structure.

The following examples further illustrate the preparation and properties of new compounds of this invention.

*Example 1.—2,3;4,5-dibenzo-1,3a,6,6a-tetraazapentalene*

2,3;4,5-dibenzo-1,3a,6,6a-tetraazapentalene was prepared according to the following scheme:

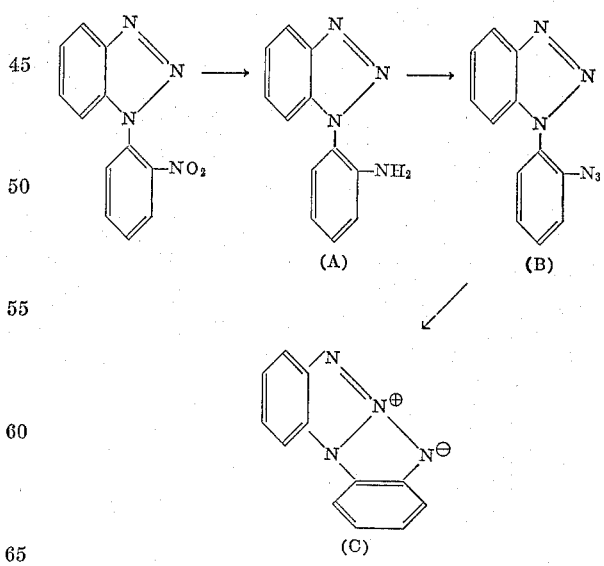

(A) *1-(o-Aminophenyl)-1,2,3-benzotriazole.*—A solution of 257 g. of 1-(o-nitrophenyl)-benzotriazole [see Vystrcil et al., Coll. Czech. Chem. Comm., 22, 1019 (1957)] in 4 liters of ethanol was hydrogenated at room temperature in an autoclave using 2 g. of platinum oxide catalyst. A total of 3.25 moles of hydrogen was absorbed. The solution was filtered and evaporated to dryness to yield a tan solid which was recrystallized from 1800 ml. of 95% ethanol to yield 160 g. of 1-(o-aminophenyl)-1,2,3-benzotriazole. A second crop (29 g.) was obtained on evaporation of the solution of 500 ml. The yield was 84%. A portion recrystallized from ethanol melted at 132 to 132.4° C.

*Analysis.*—Calcd. for $C_{12}H_{10}N_4$: C, 68.55; H, 4.79; N, 26.61. Found: C, 68.64; H, 4.85; N, 26.75, 26.95. UV: $\lambda_{max}$ 287 m$\mu$, 242 m$\mu$; $\epsilon$ 5780, 15,700.

The amine was also prepared in 87% yield by reduction of the nitro compound with sodium sulfide in aqueous ethanol.

In addition to the method indicated above, 1-(o-nitrophenyl)benzotriazole was prepared by an alternative and more convenient route as follows. A mixture of 250 g. of o-phenylenediamine, 500 g. of o-chloronitrobenzene, 500 g. of sodium acetate, 50 g. of copper powder, and 2 liters of absolute alcohol was mechanically stirred and heated to reflux on a steam bath for three days. Solvent and unreacted o-chloronitrobenzene were then removed by passing steam through the reaction mixture. The black residue was extracted with a total of 4 liters of chloroform. The chloroform solution was filtered and was washed with water and dried over magnesium sulfate. Solvent was removed under vacuum, and the residue was recrystallized from about 1800 ml. of alcohol to yield 305 g. (58%) of o-amino-o'-nitrodiphenylamine in two crops. The melting point was 106-107° C. A hot solution of 236 g. of this product in 240 ml. of acetic acid, 1 liter of water, and 1 liter of 95% ethanol was poured on 1500 g. of crushed ice, and a solution of 100 g. of sodium nitrite in 200 ml. of water was added all at once. The mixture was stirred overnight at room temperature. The solid was separated by filtration, washed with water, suction dried, and crystallized in two portions from about 1600 ml. of 95% ethanol. The yield of 1-(o-nitrophenyl)benzotriazole was 223 g. (90%) in two crops.

(B) *1-(o-azidophenyl)-1,2,3-benzotriazole.*—A 4-liter beaker equipped with a mechanical stirrer was immersed in a pan of ice, and a solution of 111.6 g. of 1-(o-aminophenyl)-1,2,3-benzotriazole in 400 ml. of hydrochloric acid and about 600 ml. of crushed ice were added. A solution of 39 g. of sodium nitrite in 250 ml. of water was added dropwise while maintaining the reaction temperature at 0-3° C. After the addition was complete, the solution was stirred for about an hour at 0-5° C. The solution was filtered, and a solution of 38 g. of sodium azide in 250 ml. of water was then added dropwise while maintaining the reaction temperature at 0-5° C. Ether was added periodically to suppress foaming. The reaction mixture was stirred overnight, during which time the ether layer evaporated. The solid product was separated by filtration, washed with water, and suction dried to yield 124.3 g. (99%) of crude white crystalline 1-(o-azidophenyl)-1,2,3-benzotriazole. A portion recrystallized from hexane for analysis melted at 84.6-85.0° C.

*Analysis.*—Calcd. for $C_{12}H_8N_6$: C, 61.01; H, 3.42; N, 35.58. Found: C, 61.52; H, 3.66; N, 36.07, 36.49, 36.52. UV: $\lambda$ 285 m$\mu$ shoulder $\lambda_{max}$ 254 m$\mu$, $\lambda$ 235 m$\mu$ shoulder; $\epsilon$ 6760, 18,600, 14,300.

(C) *2,3;4,5-dibenzo-1,3a,6,6a-tetraazapentalene.*—A solution of 124.3 g. of 1-(o-azidophenyl)-1,2,3-benzotriazole in 300 ml. of o-dichlorobenzene was added dropwise to 200 ml. of refluxing o-dichlorobenzene (oil bath at 200° C.). The solution was heated for three hours after addition was complete, and 2 g. of activated charcoal was added. The solution was filtered, and when slowly cooled, deposited 81.3 g. (74%) of grayish-white needles of 2,3;4,5-dibenzo-1,3a,6,6a-tetraazapentalene.

The product was purified by continuous elution with methylene chloride through a bed of Woelm activated alumina (300 g., neutral, activity grade 1). Evaporation of the methylene chloride gave purified product, of which a portion recrystallized from ethanol for analysis melted at 254.8 to 255.2° C.

*Analysis.*—Calcd. for $C_{12}H_8N_4$: C, 69.22; H, 3.88; N, 26.91. Found: C, 69.30; H, 3.88; N, 26.97. UV: $\lambda_{max}$ 356, 343, 280, 271, 234; $\epsilon$ 39,700, 32,500, 8250, 5900, 35,000.

The dipole moment was 4.36 Debye in benzene (0.002 M) at 25° C. Three different crystalline forms were isolated from various solvents. These forms differed significantly in the fingerprint region of the infrared spectrum, but all were converted to a single form on heating to the melting point.

*Example II.—Nitro-2,3;4,5-dibenzo-1,3a,6,6a-tetraazapentalene*

A solution of 5.0 g. of 2,3;4,5-dibenzo-1,3a,6,6a-tetraazapentalene in 200 ml. of methylene chloride was stirred vigorously at room temperature for seven days with 70 ml. of 25% nitric acid. The organic layer was separated, dried with magnesium sulfate, and evaporated to dryness. The residue was dissolved in 2.5 liters of hot 95% ethanol. On cooling, 1.23 g. of golden platelets of nitro-2,3;4,5 - dibenzo - 1,3a,6,6a - tetraazapentalene precipitated. Evaporation of the supernatant solution yielded unreacted starting material. The nitro derivative was recrystallized twice from 200 ml. of chloroform for analysis (M.P. 285.0–286.0° C.).

*Analysis.*—Calcd. for $C_{12}H_9N_5O_2$: C, 56.90; H, 2.79; N, 27.66. Found: C, 57.15; H, 2.85; N, 27.91.

*Spectra.*—UV: $\lambda_{max}$ 405 m$\mu$, 311, 274, 242 m$\mu$ sh., 230; $\epsilon$ 20,400, 9300, 7750, 19,800, 25,800. IR: (KBr) 1522 and 1320 cm.$^{-1}$ ($NO_2$ absorption).

*Example III.—Dinitro-2,3;4,5-dibenzo-1,3a,6,6a-tetraazapentalene*

Five grams of 2,3;4,5-dibenzo-1,3a,6,6a-tetraazapentalene was added in small portions to 100 ml. of 70% nitric acid at 0–5° C. A vigorous reaction occurred, and 6.4 g. of crude dinitro-2,3;4,5-dibenzo-1,3a,6,6a-tetraazapentalene separated. It had but slight solubility in hot chloroform and hot acetone. A portion recrystallized from acetone for analysis melted at 400–403° C. with decomposition.

*Analysis.*—Calcd. for $C_{12}H_6N_6O_4$: C, 48.33; H, 2.03; N, 28.18. Found: C, 48.06; H, 2.01; N, 28.36.

*Spectra.*—UV: $\lambda_{max}$ 428 m$\mu$ (acetone), 332 (acetone), 274 (ethanol), 237 (ethanol); $\epsilon$ 36,700, 12,600, 14,300, 31,800. IR: (KBr) 1520 and 1342/1320 doublet ($NO_2$ absorption).

*Example IV.—Tetranitro-2,3;4,5-dibenzo-1,3a,6,6a-tetraazapentalene*

To 50 ml. of ice cold yellow fuming (90%) nitric acid was added 0.81 g. of 2,3;4,5-dibenzo-1,3a,6,6a-tetraazapentalene. The solution was warmed to 60–75° C. for 10 minutes. On the addition of water, 1.46 g. of crude yellow tetranitro-2,3;4,5-dibenzo 1,3a,6,6a-tetraazapentalene was isolated. This product is soluble in hot fuming nitric acid and in hot cyclohexanone. It is sparingly soluble in hot acetone, hot nitromethane, and hot dimethylformamide. A 0.62 g. portion was recrystallized from 200 ml. of boiling acetone. On vacuum drying at 110° C. the shining orange crystals became rather dull in appearance. The dried crystals melted with decomposition at 400° C.

*Analysis.*—Calcd. for $C_{12}H_4N_8O_8$: C, 37.12; H, 1.03; N, 28.86. Found: C, 36.81; H, 1.46; N, 28.66. UV: $\lambda_{max}$ 452 m$\mu$ (dioxane), 374 (dioxane), 311 (dioxane), 260 (dioxane); $\epsilon$ 58,600, 2590, 17,000, 14,800.

*Example V.—Tetranitro-2,3;4,5-dibenzo-1,3a,6,6a-tetraazapentalene*

To 375 ml. of 95% nitric acid were added, over a period of 20 minutes, 25 g. of 2,3;4,5-dibenzo-1,3a,6,6a-tetraazapentalene. At the beginning of the addition, the reactants were at room temperature; during the addition, the temperature rose to 62° C. The mixture was stirred for an additional 10 minutes, and then was drowned in three times its volume of ice water. Tetranitro-2,3;4,5-dibenzo-1,3a,6,6a-tetraazapentalene crystallized out in the amount of 45 g. Nitrogen analysis: 28.39; 28.42 (calcd. 28.86).

The procedure described above can be repeated using 70% nitric acid, but in this case in order to assure formation of the tetranitro derivative, the mixture is refluxed for 0.5 hour after the addition of the nitric acid. Even more dilute aqueous nitric acid solutions can be employed, for example, aqueous nitric acid having a concentration as low as about 25%. However, in this case, longer reflux times are employed in order to assure nitration.

*Example VI.—Dichloro-2,3;4,5-dibenzo-1,3a,6,6a-tetraazapentalene*

Chlorine gas was bubbled slowly over a period of three hours through a solution of 5.0 g. of 2,3;4,5-dibenzo-1,3a,6,6a-tetraazapentalene in 1 liter of refluxing carbon tetrachloride containing 0.1 g. of iodine and 0.1 g. of ferric chloride (anhydrous). The solution was cooled, and after standing overnight 2.65 g. of gray dichloro-2,3;4,5-dibenzo-1,3a,6,6a - tetraazapentalene precipitated. This solid after dissolving in xylene, treatment with decolorizing charcoal, and recrystallization, melted at 254–257.5° C.

*Analysis.*—Calcd. for $C_{12}H_6N_4Cl_2$: C, 52.01; H, 2.19. N, 20.22; Cl, 25.59. Found: C, 51.76; H, 2.31; N, 20.26; Cl, 25.49.

*Spectrum.*—UV: $\lambda_{max}$ 373, 357, 288, 278, 244; $\epsilon$ 47,400, 34,400, 6040, 6110, 48,500.

Evaporation of the filtrate from the reaction mixture yielded 1.86 g. of a mixture of more highly chlorinated products.

*Example VII.—Diamino-2,3;4,5-dibenzo-1,3a,6,6a-tetraazapentalene*

A suspension of 7.0 g. of dinitro-2,3;4,5-dibenzo-1,3a,6,-6a-tetraazapentalene in 180 ml. of warm dimethylformamide containing 0.5 g. of 10% palladium-on-charcoal catalyst was hydrogenated at 40 pounds pressure in a Parr hydrogenation apparatus. Two such runs were combined, filtered, and poured on a mixture of ice and deaerated water weighing approximately 1 kilogram. The brown solid diamino-2,3;4,5-dibenzo-1,3a,6,6a-tetraazapentalene was filtered under nitrogen and weighed 11.9 g. after drying. It was stored in a nitrogen atmosphere since it darkened rapidly in the presence of oxygen.

The disappearance of the strong absorptions in the infrared spectrum at 1520 and 1342/1320 cm.$^{-1}$ and the appearance of absorptions at 3300, 3350, and 1630 cm.$^{-1}$ indicated that the nitro groups had been completely reduced to amino groups.

*Example VIII.—Azidotrinitro-2,3;4,5-dibenzo-1,3a,6,6a-tetraazapentalene*

One gram of tetranitro-2,3;4,5-dibenzo-1,3a,6,6a-tetraazapentalene was dissolved in 25 ml. of hot dimethylformamide. To this solution was added four grams of lithium azide dissolved in 65 ml. of dimethylformamide at 70° C. The mixture was stirred for 1½ hours, during which period the temperature was allowed to decrease to 25° C. The solid which separated was collected by filtration, washed with fresh dimethylformamide, 95% ethanol, and ether. Additional product was obtained on diluting the filtrate with 125 ml. of ice water. The total yield of azidotrinitro-2,3;4,5-dibenzo-1,3a,6,6a - tetraazapentalene was 0.90 g.

*Analysis.*—Calcd. for $C_{15}H_{11}N_{11}O_7$ (monoazide·dimethylformamide): C, 39.39; H, 2.43; N, 33.30. Found: C, 39.96; H, 2.80; N, 34.06.

*Example IX.—Diazidodinitro-2,3;4,5-dibenzo-1,3a,6,6a-tetraazapentalene*

To a hot (135° C.) solution of 1.5 g. of tetranitro-2,3;4,5-dibenzo-1,3a,6,6a-tetraazapentalene in 30 ml. of dimethylformamide was added a solution of 4.5 g. of lithium azide in the same solvent. The reaction mixture was filtered while the temperature decreased to 80° C. This temperature was then maintained for an additional 15 minutes. The reaction mixture was poured into two volumes of ice water with stirring. The solid which separated was collected by filtration and washed with water and dried. The yield of diazidodinitro-2,3;4,5-dibenzo-1,3a,6,6a-tetraazapentalene was 1.6 g.

*Analysis.*—Calcd. for $C_{15}H_{11}N_{13}O_5$ (diazido derivative·dimethylformamide): C, 39.73; H, 2.45; N, 40.17. Found: C, 39.74; H, 2.61; N, 41.08.

*Example X.—2,3;4,5-dibenzo-1,3a,6,6a-tetraazapentalene bis(sulfonyl chloride)*

A solution of 0.5 g. of 2,3;4,5-dibenzo-1,3a,6,6a-tetraazapentalene in 10 ml. of chlorosulfonic acid was heated in a flask immersed in an oil bath whose temperature was gradually raised to 90° C. over a period of an hour. The temperature was held at 90° C. for 30 minutes and the reaction mixture was cooled and poured on 50 g. of ice. The yellow solid product was separated by filtration and washed with water. After recrystallization from acetic acid/carbon tetrachloride it melted at 263–265° C. with decomposition. A second recrystallization from acetic acid/carbon tetrachloride produced rod-shaped crystals of the bis(sulfonyl chloride) of 2,3;4,5-dibenzo-1,3a,6,6a-tetraazapentalene melting at 277-278.5° C. (dec.).

*Analysis.*—Calcd. for $C_{12}H_6N_4S_2O_4Cl_2$: C, 35.58; H, 1.49; N, 13.83; S, 15.83. Found: C, 35.62; H, 0.54; N, 13.53; S, 15.29.

The bis(sulfonyl chloride) when dissolved in aqueous sodium hydroxide solution forms the sodium salt of 2,3;4,5 - dibenzo - 1,3a,6,6a - tetraazapentalene disulfonic acid.

When the bis(sulfonyl chloride) of 2,3;4,5-dibenzo-1,-3a,6,6a-tetraazapentalene is reacted with a two molar amount of methylmagnesium bromide in an inert solvent, the corresponding bis(methylsulfonyl)-2,3;4,5-dibenzo-1,-3a,6,6a-tetraazapentalene is produced. Reaction of the bis(sulfonyl chloride) with excess anisole at elevated temperature in the presence of aluminum chloride results in the formation of bis(p-methoxyphenylsulfonyl)-2,3;4,5-dibenzo-1,3a,6,6a-tetraazapentalene.

In the process for the preparation of the new tetraazapentalenes, benzenoid groups having hydrocarbyl substituents can be employed. For example, when the general procedure of Example I is repeated except that 1-(o-nitrophenyl)naphthotriazole, 1-(o-nitro-p-tolyl)benzotriazole, and 1-(o-nitro-p-tolyl)-5-ethylbenzotriazole are used, there are obtained 2,3-naphtho-4,5-benzo-1,3a,6,6a-tetraazapentalene, 2,3-benzo-4,5-(4-methylbenzo) - 1,3a,6,6a-tetraazapentalene, and 2,3-(3-ethylbenzo)-4,5-(4-methylbenzo)-1,3a,6,6a-tetraazapentalene.

Similarly, when α,β-diaminonaphthalene is reacted with α-nitro-β-chlornaphthalene and the reaction product treated with nitrous acid there is obtained 1-(α-nitro-β-naphthyl)naphthotriazole which after reduction to the amine and formation of the azide through the diazonium salt and decomposition of the latter yields 2,3;4,5-bis-(α,β-naphtho)-1,3a,6,6a-tetraazapentalene.

When bromine is used in place of chlorine in Example VI, the corresponding dibromo-2,3;4,5-dibenzo-1,3a,6,6a-tetraazapentalene is obtained.

When 4,6-dimethyl-2-nitroaniline is treated with nitrous acid and hydrofluoboric acid, 4,6-dimethyl-2-nitrophenyl fluoride results. Reaction of the latter in the presence of copper powder with 4,6-dimethyl-2-aminoaniline (from reduction of more of the 4,6-dimethyl-2-nitroaniline) gives N-(4,6 - dimethyl - 2 - aminophenyl) - 2 - nitro - 4,6-dimethylaniline which on reaction as described in Example I, i.e., by nitrosation, reduction, azide formation and heat, yields 2,3;4,5-di-(dimethylbenzo) - 1,3a,6,6a-tetraazapentalene. The latter upon nitration as described in Example IV gives the 2,3;4,5-bis(dinitrodimethylbenzo)-1,3a,6,6a-tetraazapentalene.

The compounds of this invention absorb ultraviolet light. They are useful in the preparation of filters for absorption of ultraviolet light. The unsubstituted 2,3;4,5-dibenzo-1,3a,6,6a-tetraazapentalene is particularly interesting since it is substantially colorless in the visible and has utility in the preparation of a sunburn screening cream, e.g., obtained by melting triethanolamine (0.5 part), stearic acid (2 parts), white wax (2 parts), stearyl alcohol (8 parts), adding 5 parts of finely divided 2,3;4,5-dibenzo-1,3a,6,6a-tetraazapentalene and 1 part of titanium dioxide and dispersing the mixture into warm glycerol/water (10/75).

In addition to the above utility, specific compounds are also useful in other applications. For example, the tetranitro derivative, although extremely stable at elevated temperatures (e.g., 300° C. or higher) for extended periods, is an explosive.

The following example illustrates the unique explosive properties of tetranitro-2,3;4,5-dibenzo-1,3a,6,6a-tetraazapentalene obtained in accordance with this invention.

*Example XI*

The explosive properties of tetranitro-2,3;4,5-dibenzo-1,3a,6,6a-tetraazapentalene prepared as described in Example V were determined as follows. ½" x ½" pellets of the tetranitro derivative were heated at 600° F. for 2 hours without any adverse effect on the explosive. Impact sensitivity was determined by placing a small quantity of the explosive on a steel plate, then dropping a 5 kilogram weight on the explosive from various heights. When the 5 kilogram weight was dropped on several samples from a height of 37 inches, the product detonated in about 50% of the trials. Tetranitro-2,3;4,5-dibenzo-1,3a,6,6a-tetraazapentalene did not ignite or detonate when a charge of 77,500 volts at 0.0003 microfarad was applied thereto thus showing that the compound was static insensitive. Despite its insensitivity to impact and static, the tetranitro-2,3;4,5-dibenzo - 1,3a,6,6a - tetraazapentalene was easily initiated by a lead azide primer containing as little as 0.4 grain of lead azide. The tetranitro-2,3;4,5-dibenzo-1,3a,6,6a-tetraazapentalene had a ballistic mortar value of 96%. The ballistic mortar value was determined by the standard ballistic mortar test which comprises measuring the degree of swing produced in a pendulum when a sample of explosive is fired. The ballistic mortar value, expressed as percent TNT, is determined by comparing the quantity of explosive under test necessary to produce the same swing as 10 grams of TNT and is calculated by dividing 10 by the grams of explosive giving the same deflection as 10 grams of TNT and multiplying by 100. The detonation velocity of the tetranitro-2,3;4,5-dibenzo-1,3a,6,6a-tetraazapentalene in substantial mass is 7200 meters per second at a density of 1.64. Although the tetranitro derivative prepared as described hereinbefore may consist of several isomers depending upon the relative positions of the two nitro groups on each ring, as far as explosive properties are concerned, there is no material distinction between such isomers.

The tetranitro - 2,3;4,5 - dibenzo - 1,3a,6,6a - tetraazapentalene can be used in conventional applications for high explosives, but finds particular utility in explosive compositions, devices and assemblies which are likely to be exposed to high temperatures for protracted periods. It can be used alone or in combination with other conventional additives, for example, inorganic oxidizing agents such as potassium perchlorate or lead dinitrate. A preferred binding agent for the tetranitro-2,3;4,5-dibenzo-1,3a,6,6a-tetraazapentalene comprises an epoxy resin having greater than one epoxy group per molecule and a curing agent therefor comprising pyromellitic dianhydride or a condensation product thereof with a polyhydric alcohol in a molar ratio of at least 1.5 to 1, the pyromellitic dianhydride or adduct thereof providing about from 0.5 to 1.0 anhydride group for each epoxy group of the epoxy resin. Usually about from 5 to 20% by weight of binding agent based on the weight of tetranitro derivative and binding agent is employed. The pyromellitic dianhydride adducts used in such binding agents are described in more detail in copending application Serial No. 840,251, filed September 16, 1959 in the name of T. J. Hyde. The epoxy resins can be any of the conventional glycidyl polyethers of polyhydric phenols or alcohols, acyclic diepoxide resins, aliphatic polyepoxide resins, etc. Mixtures of the binding agent and tetranitro derivative can be prepared by merely mixing the tetranitro derivative with a solution, e.g., in acetone or methyl ethyl ketone, of the resin and curing agent, then evaporating the solvent therefrom. The resulting product can be stored at low temperatures until articles are to be fabricated therefrom, then pressed to the desired shape and cured at elevated temperature, e.g., 50 to 350° F.

Tetranitro - 2,3;4,5 - dibenzo - 1,3a,6,6a - tetraazapentalene can be used alone or in combination with the aforementioned additives in detonating cords, blasting caps and other initiators, booster mechanisms, shaped charges for oil well perforating and steel furnace tapping, explosive release or disconnect devices and explosively activated mechanisms of all sorts. For example, detonating cords can be prepared by filling tubes of aluminum or other ductile metals with the tetranitro derivative and drawing the resulting product through a series of dies. Detonating cords having a fibreglass sheath or a sheath of a waterproof material such as a plastic fluorocarbon can also be prepared by conventional fabricating techniques. Shaped charges for perforating oil wells such as those described in U.S. Patent No. 2,399,211, and shaped charges for tapping blast furnaces such as those disclosed in U.S. Patent No. 2,563,131 also can be prepared from the tetranitro - 2,3;4,5 - dibenzo - 1,3a,6,6a - tetraazapentalene.

I claim:
1. A compound of the formula

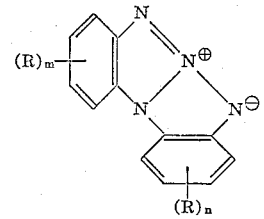

wherein the R's are selected from at least one of the group consisting of nitro, halo, azido, amino, sulfonyl and 1 to 4 carbon atom hydrocarbon radicals free from non-benzenoid unsaturation and $m$ plus $n$ equals a cardinal number of up to 4.

2. 2,3;4,5 - dibenzo - 1,3a,6,6a - tetraazapentalene.

3. Tetranitro - 2,3;4,5 - dibenzo - 1,3a,6a,6a - tetraazapentalene.

References Cited in the file of this patent
UNITED STATES PATENTS
Re. 25,238    Carboni _____ Sept. 11, 1962
OTHER REFERENCES
Wagner et al.: Synthetic Organic Chemistry (New York, 1953), pages 654–657.

PO-1050
(5/69)

UNITED STATES PATENT OFFICE
CERTIFICATE OF CORRECTION

Patent No. 3,166,567            Dated    January 19,965

Inventor(s)   Rudolph A. Carboni

It is certified that error appears in the above-identified patent and that said Letters Patent are hereby corrected as shown below:

Col. 3, line 22, "pasisng" should be
              -- passing --;

Col. 8, line 63, Claim 3, "-1,3a,6a,6a" should be
              -- -1,3a,6,6a --.

Signed and sealed this 5th day of September 1972.

(SEAL)
Attest:

EDWARD M. FLETCHER, JR.         ROBERT GOTTSCHALK
Attesting Officer               Commissioner of Patents